United States Patent
Celik

(10) Patent No.: US 10,639,934 B2
(45) Date of Patent: May 5, 2020

(54) SHEAR BAND FOR A STRUCTURALLY SUPPORTED TIRE

(71) Applicant: The Goodyear Tire & Rubber Company, Akron, OH (US)

(72) Inventor: Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 321 days.

(21) Appl. No.: 15/358,684

(22) Filed: Nov. 22, 2016

(65) Prior Publication Data

US 2018/0141380 A1 May 24, 2018

(51) Int. Cl.
| | |
|---|---|
| *B60C 7/10* | (2006.01) |
| *B60C 7/28* | (2006.01) |
| *B60C 9/20* | (2006.01) |
| *B60C 9/18* | (2006.01) |
| *B60C 7/26* | (2006.01) |

(52) U.S. Cl.
CPC .............. *B60C 7/102* (2013.01); *B60C 7/26* (2013.01); *B60C 7/28* (2013.01); *B60C 9/1807* (2013.01); *B60C 9/20* (2013.01); *B60C 9/2009* (2013.01)

(58) Field of Classification Search
CPC .. B60C 7/00; B60C 7/10; B60C 7/102; B60C 7/14; B60C 7/143; B60C 7/24; B60C 7/26; B60C 9/20; B60C 9/2009; B60C 9/1807
See application file for complete search history.

(56) References Cited

U.S. PATENT DOCUMENTS

| | | | | |
|---|---|---|---|---|
| 1,016,991 | A * | 2/1912 | Herold | B60C 7/14 152/268 |
| 3,863,515 | A * | 2/1975 | Meadows | F16G 5/08 474/262 |
| 3,881,974 | A * | 5/1975 | de Zarauz | B29D 30/20 156/117 |
| 3,989,083 | A * | 11/1976 | Chrobak | B60C 9/06 152/556 |
| 6,769,465 | B2 * | 8/2004 | Rhyne | B60C 9/18 152/197 |
| 6,840,295 | B2 | 1/2005 | Ruffa | |
| 7,281,553 | B1 * | 10/2007 | Roesgen | B60C 17/0009 152/197 |

(Continued)

FOREIGN PATENT DOCUMENTS

| | | |
|---|---|---|
| DE | 3327670 A1 | 2/1985 |
| EP | 0921019 A2 | 6/1999 |

(Continued)

OTHER PUBLICATIONS

European Search Report dated Mar. 12, 2018 for Application Serial No. EP17202101.

*Primary Examiner* — Kip T Kotter
(74) *Attorney, Agent, or Firm* — Robert N. Lipcsik

(57) ABSTRACT

A structurally supported tire includes a ground contacting annular tread portion, an annular hoop structure for supporting a load on the tire, and a ply structure secured to a vehicle rim and the tread portion. The hoop structure is secured to a radially inner surface of the ply structure. The hoop structure includes a first double layer of steel cords and a second double layer of steels cords sandwiching a first layer of non-woven reinforcement, a second layer of non-woven reinforcement, and a single layer of steel cords.

7 Claims, 4 Drawing Sheets

(56) References Cited

U.S. PATENT DOCUMENTS

| | | |
|---|---|---|
| 8,215,351 B2 | 7/2012 | Thompson |
| 8,609,220 B2 | 12/2013 | Summers |
| 8,651,156 B2 | 2/2014 | Fadel |
| 8,688,421 B2 | 4/2014 | Summers |
| 8,813,797 B2 | 8/2014 | Anderson |
| 8,960,248 B2 | 2/2015 | Cron |
| 8,999,480 B2 | 4/2015 | Summers |
| 2015/0097419 A1* | 4/2015 | Mizusawa ............ B62D 55/242 305/170 |
| 2017/0157983 A1* | 6/2017 | Siegel ....................... B60C 7/14 |
| 2017/0166002 A1* | 6/2017 | Benzing, II ............... B60B 9/00 |
| 2017/0166009 A1* | 6/2017 | Benzing, II ............... B60C 7/00 |
| 2017/0174002 A1* | 6/2017 | Downing ................... B60C 7/10 |
| 2017/0297373 A1* | 10/2017 | Sportelli ................. B60C 7/102 |
| 2018/0050561 A1* | 2/2018 | Benzing, II ............... B60C 7/10 |

FOREIGN PATENT DOCUMENTS

| | | | | |
|---|---|---|---|---|
| EP | 3135501 A1 * | 3/2017 | ......... | B60C 11/0041 |
| FR | 2844479 A1 | 3/2004 | | |
| FR | 2856635 A1 | 12/2004 | | |

* cited by examiner

SHEAR BAND FOR A STRUCTURALLY SUPPORTED TIRE

FIELD OF THE INVENTION

The present invention relates generally to vehicle tires and wheels, and more particularly, to non-pneumatic tire/wheel assemblies.

BACKGROUND OF THE INVENTION

The pneumatic tire has been the solution of choice for vehicular mobility for over a century. Modern belted, radial carcass, pneumatic tires are remarkable products that provide an effective means for supporting applied loads while allowing reasonable vertical and lateral compliance. The pneumatic tire obtains its mechanical attributes largely due to the action of internal air pressure in the tire cavity. Reaction to the inflation pressure corrects rigidities to the belt and carcass components. Inflation pressure is then one of the most important design parameters for a pneumatic tire.

Good pressure maintenance is required to obtain the best performance from a pneumatic tire. Inflation pressure below that specified can result in a loss of fuel economy. Of primary importance is that a conventional pneumatic tire is capable of very limited use after a complete loss of inflation pressure. Many tire constructions have been proposed for continued mobility of a vehicle after a complete loss of air pressure from the tire. Commercially available runflat tire solutions are pneumatic tires having added sidewall reinforcements or fillers to permit the sidewalls to act in compression as load supporting members during deflated operation. This added reinforcement often results in the disadvantages of higher tire mass and reduced riding comfort. Other attempts to provide runflat capability utilize essentially annular reinforcing bands in the tire crown portion. In these solutions, the rigidity of the tread portion results partly from the inherent properties of the annular reinforcing band and partly from the reaction to inflation pressure. Still other solutions rely on secondary internal support structures attached to the wheel. These supports add mass to the mounted assembly and either increase mounting difficulty or may require the use of multiple piece rims. All of these approaches are hybrids of an otherwise pneumatic tire structure and suffer from design compromises that are optimal for neither the inflated nor deflated states. In addition, these runflat solutions require the use of some means to monitor tire inflation pressure and to inform the vehicle operator if the inflation pressure is outside the recommended limits.

A tire designed to operate without inflation pressure may eliminate many of the problems and compromises associated with a pneumatic tire. Neither pressure maintenance nor pressure monitoring is required. Structurally supported tires such as solid tires or other elastomeric structures to date have not provided the levels of performance required from a conventional pneumatic tire. A structurally supported tire solution that delivers pneumatic tire-like performance would be a desirous improvement.

SUMMARY OF THE INVENTION

A structurally supported tire in accordance with the present invention includes a ground contacting annular tread portion, an annular hoop structure for supporting a load on the tire, and a ply structure secured to a vehicle rim and the tread portion. The hoop structure is secured to a radially inner surface of the ply structure. The hoop structure includes a first double layer of steel cords and a second double layer of steels cords sandwiching a first layer of non-woven reinforcement, a second layer of non-woven reinforcement, and a single layer of steel cords.

According to another aspect of the tire, inner radii of the ply structure are attached to the vehicle rim through two mechanical clamps each capturing a part of the ply structure.

According to still another aspect of the tire, inner radii of the ply structure are attached to the vehicle rim through mechanical clamps and a clamping force is strengthened by adding rings around which the ply structure is folded.

According to yet another aspect of the tire, an axial distance between the first axial limit and the second axial limit is decreased by an adjustment mechanism so that the axial distance is less than an axial width of the tread portion.

According to still another aspect of the tire, the hoop structure is constructed of multiple layers allowing shear strain between the multiple layers.

According to yet another aspect of the tire, the first double layer of steel cords extend at an angle of between −5° to +5° relative to the circumferential direction of the tire.

According to still another aspect of the tire, the second double layer of steel cords extend at an angle of between −5° to +5° relative to the circumferential direction of the tire.

According to yet another aspect of the tire, the single layer of steel cords absorb shear strain between the first double layer and the second double layer.

According to still another aspect of the tire, the first layer of non-woven reinforcement consists of a polyester or nylon 6,6 material.

A structurally supported tire and rim assembly in accordance with the present invention includes a ground contacting annular tread portion, an annular hoop structure for supporting a load on a tire, the hoop structure including a first double layer of steel cords and a second double layer of steels cords sandwiching a first layer of non-woven reinforcement, a second layer of non-woven reinforcement, and a single layer of steel cords, and a ply structure secured to a vehicle rim.

According to another aspect of the assembly, the ply structure includes a plurality of strips of material extending between the vehicle rim and adjacent the hoop structure.

According to still another aspect of the assembly, the ply structure consists of one single strip of material extending repeatedly between the vehicle rim and adjacent the hoop structure.

According to yet another aspect of the assembly, the single layer of steel cords absorbs shear strain between the first double layer and the second double layer.

Another structurally supported tire includes a ground contacting annular tread portion, an annular hoop structure for supporting a load on a tire, the hoop structure including a first double layer of steel cords and a second double layer of steels cords sandwiching a first layer of non-woven reinforcement, a second layer of non-woven reinforcement, and a single layer of steel cords, and a ply structure secured to a first axial limit and extending radially outward to adjacent the hoop structure and further extending radially inward from adjacent the hoop structure to a second axial limit, the ply structure being secured to both the first axial limit and the second axial limit.

BRIEF DESCRIPTION OF THE DRAWINGS

The present invention will be better understood through reference to the following description and the appended drawings, in which.

DEFINITIONS

Figure 1:
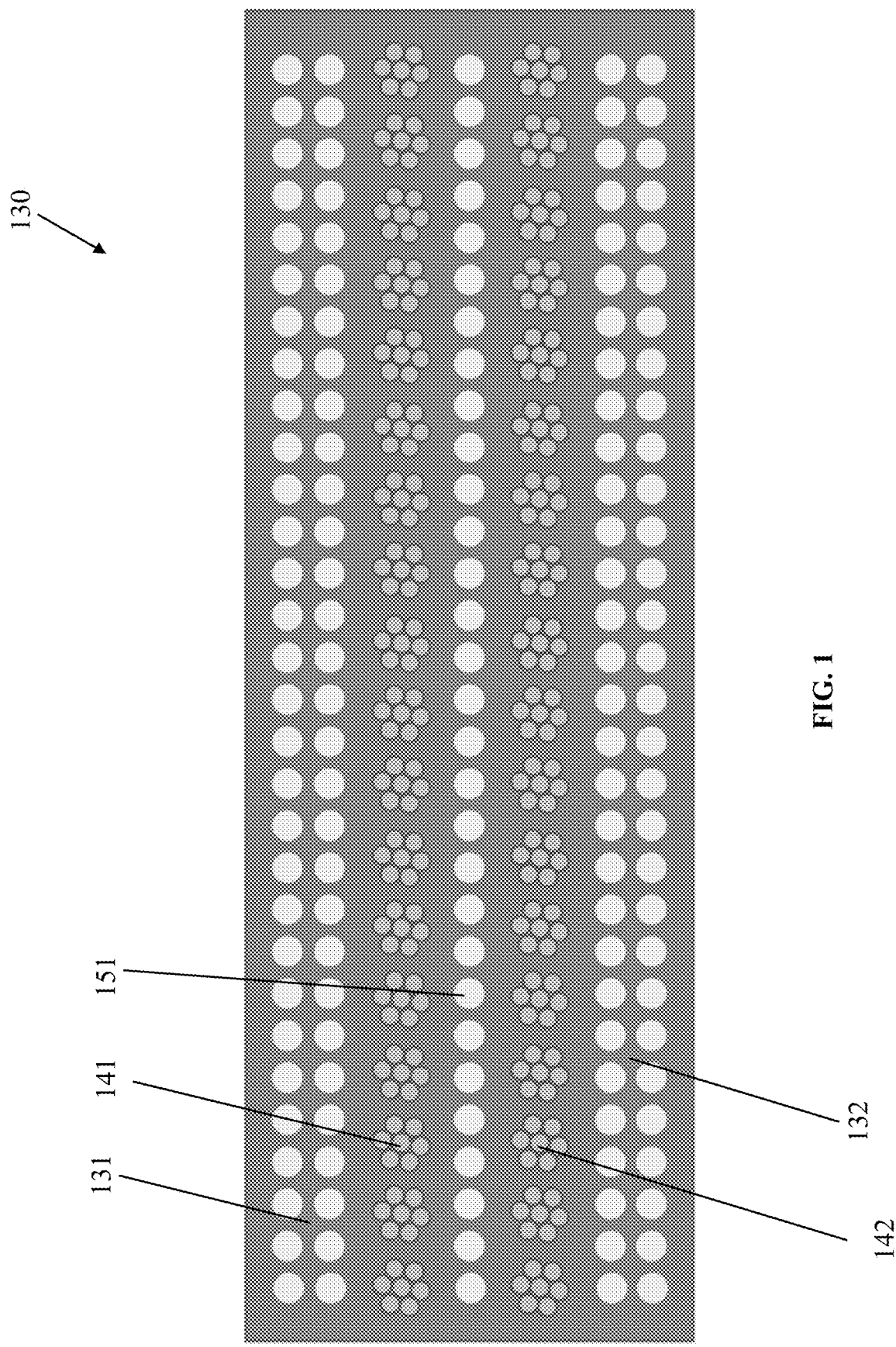
FIG. 1 is a schematic cross section view of part of a tire/wheel assembly in accordance with the present invention.

The following terms are defined as follows for this description.

"Equatorial Plane" means a plane perpendicular to the axis of rotation of the tire passing through the centerline of the tire.

"Meridian Plane" means a plane parallel to the axis of rotation of the tire and extending radially outward from said axis.

"Shear Stiffness" of the shear band GA. The shear stiffness GA may be determined by measuring the deflection $\Delta X$ on a shear band of length L from a force F as shown below and the following equation: $GA=F*L/\Delta X$ "Bending Stiffness" of the shear band EI. The bending stiffness EI may be determined from beam mechanics using a three point bending test. EI may represent a beam resting on two roller supports and subjected to a concentrated load applied in the middle of the beam. The bending stiffness EI may be determined from the following equation: $EI=PL3/48*\Delta X$, where P is the load, L is the beam length, and $\Delta X$ is the deflection.

"Extensional Stiffness" of the shear band EA. The extensional stiffness EA may be is determined by applying a tensile force in the circumferential direction of the shear band and measuring the change in length.

"Hysteresis" means the dynamic loss tangent measured at 10 percent dynamic shear strain and at 25° C.

DETAILED DESCRIPTION OF EXAMPLES OF THE PRESENT INVENTION

Conventional structurally supported tires may support a load without the support of gas inflation pressure. Such a tire may have a ground contacting tread portion, sidewall portions extending radially inward from the tread portion and bead portions at the end of the sidewall portions. The bead portions may anchor the tire to a vehicle wheel. The tread portion, sidewall portions, and bead portions may define a hollow, annular space. Alternately, the bead portion and the tread portion may be connected in the radial direction by a conventional connecting web, which may consist of a number of different geometries. These geometries may include a plurality of radial spokes or a network of polygons, such as hexagons.

One conventional structurally supported tire may have a connecting web or sidewall portion attached thereto. Such a connecting web or sidewall structure does not extend radially beyond a radially inward side of the first membrane. This attachment may be achieved through an adhesive bond. Since the first and second membranes and the intermediate shear layer of this tire together have significant hoop compression stiffness, the interface between the connecting web or sidewall portion and the radially inward side of the first membrane may be will necessarily be exposed to significant shear stresses that tend to degrade or damage the adhesive bond at the interface as the tire is rotated under load (e.g., a large number of load cycles, etc.).

The connecting web or sidewall portion or ply structure may extend radially outward of the hoop structure. Alternatively, the connecting web or sidewall portion or ply structure may extend radially between the first and second membrane, or between the second and third membrane, of the hoop structure. Such a construction may be secured together by a curing step, cohesion, and/or by adhesion. Due to the positioning of the connecting web or sidewall portion or ply structure radially within the hoop structure, the interfaces of the layers may not advantageously eliminate and/or greatly mitigate damaging shear stresses incurred by the conventional tire.

The connecting web or sidewall portion or ply structure may be reinforced by essentially inextensible cords oriented at or near the radial direction. The force/elongation characteristics of the sidewall portions may be such that tensile forces produce minimal elongation of the connecting web or sidewall portion or ply structure, such as an increase of tension in a string may produce minimal elongation of the string. For example, the connecting web or sidewall portion or ply structure may a high stiffness in tension, but very low stiffness in compression.

The connecting web or sidewall portion or ply structure may be essentially inextensible in tension and essentially without resistance to compression and/or buckling. Under this condition, an externally applied load may be supported substantially by vertical tensile forces in the connecting web or sidewall portion or ply structure in the region above the axle without vertical tensile forces in the region below the axle. Vertical stiffness may relate to the ability of the tire to resist vertical deflection when under load. A tire or assembly in accordance with the present invention requires no pneumatic support, and therefore no air pressure maintenance or performance loss due to sudden loss of pressure.

Figure 3:
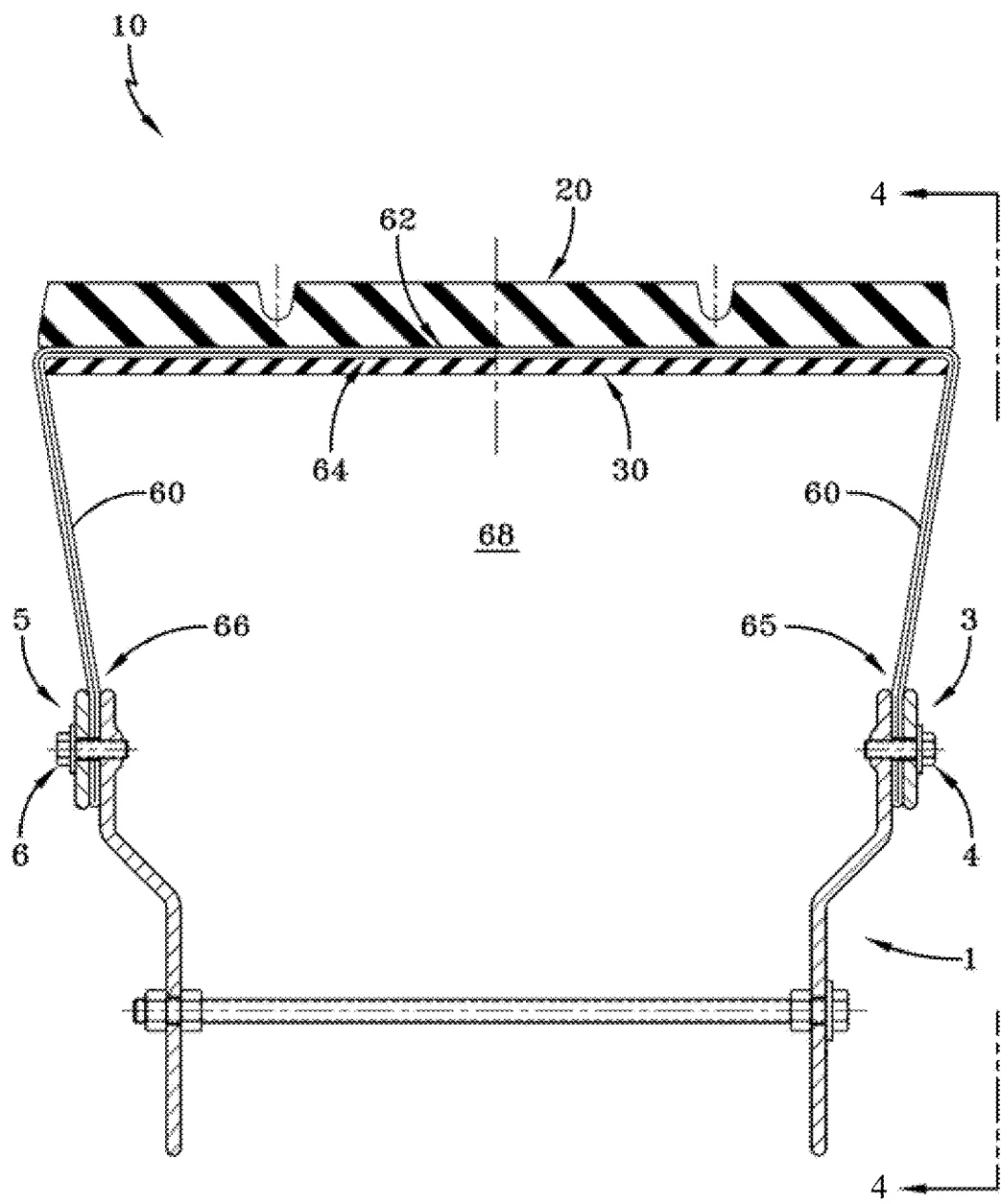
FIG. 3 is a schematic cross section view of a tire/wheel assembly for use with the present invention.
Figure 4:
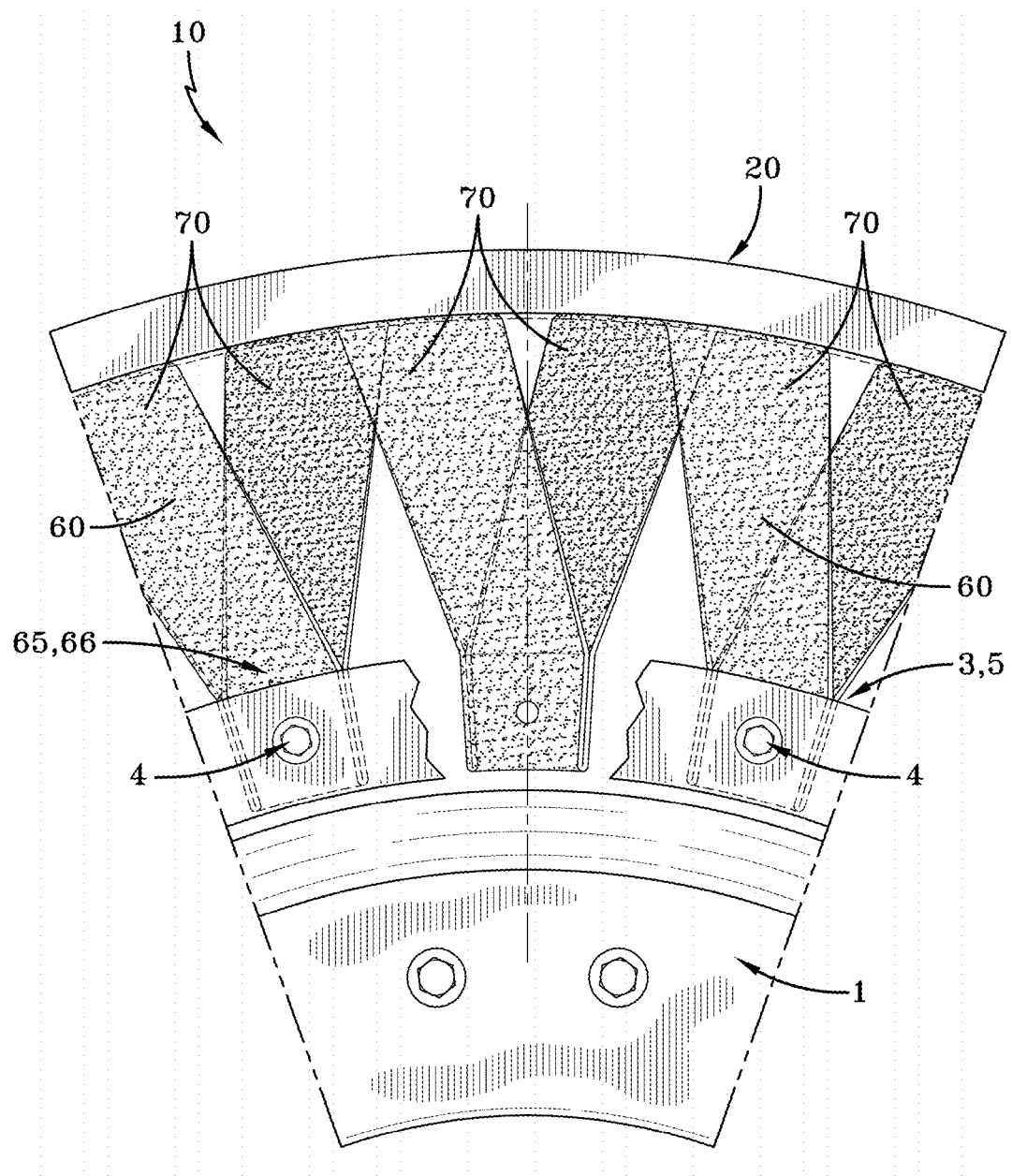
FIG. 4 is a schematic elevation taken along line "4-4" in FIG. 3.

As shown in FIGS. 3-4, an example structurally supported tire 10 for use with the present invention may include a ground contacting annular tread portion 20, a hoop structure 30 for supporting a load on the tire, and a ply structure 60 secured to a first axial limit of an outer radius of a rim 1 and extending radially outward and between the hoop structure and the tread portion and further extending radially inward from between the hoop structure and tread portion to a second axial limit of the outer radius of the rim. The tread portion 20 may be secured to a radially outer surface 62 of the ply structure 60. The hoop structure 30 may be secured to a radially inner surface 64 of the ply structure 60. The attachment of the ply structure 60 to the rim 1 may be accomplished in a number of ways. For example, the vehicle rim 1 may have a first clamp 3 and a second clamp 5. The first clamp 3 may squeeze and secure a first part 65 of the ply structure 60. The second clamp 5 may squeeze and a second part 66 of the ply structure 60.

Alternatively, the first clamp 3 may squeeze and secure both the first part 65 of the ply structure 60 and a first ring (not shown) thus eliminating the necessity for a first ring to be inextensible (e.g., like conventional bead structures). The second clamp 5 may squeeze and secure both the second part 66 of the ply structure 60 and a second ring (not shown) thus eliminating the necessity for the second ring to be inextensible (e.g., like conventional bead structures). If used, the non-load bearing first and second rings may therefore be an inexpensive material, such as a very inexpensive polymer O-ring. Further, adhesives and mechanical fasteners 4, 6

(e.g., bolts, etc.) may also be used to squeeze/secure and/or supplement the attachment to the first and second parts 65, 66 of the ply structure.

As shown in FIG. 4, the ply structure 60 may be defined by strips 70 of material extending from the first clamp 3 radially outward and around the hoop structure 30 and to the second clamp 5. As described below, the strips 70 may be a layered and reinforced ply material capable of bearing a large tensile load and very little compressive load.

As described above, the tire 10 may include the hoop structure, or shear band 30 and the ply structure 60. The ply structure 60 may be built at a conventional bead diameter and then stretched up over the shear band 30. The path of the ply structure 60 may extend radially inward from the radially outermost portion of the shear band 30. This may allow reinforcing the ply cords to provide lateral strength to the shear band 30 while also filling part of any gap between the radially outer portion of the ply structure 60 and a radially inner portion of the shear band. An angle may be varied to adjust tension in the ply structure 60 and also increase and/or tune lateral stiffness of the tire 10 overall. The angle may also be zero degrees or even negative if desired (not shown). Thus, the angle provides an important tuning parameter lacking in any conventional structurally supported, non-pneumatic, or pneumatic tires.

The reinforced annular band or hoop structure 30 may be disposed radially inward of the tread portion 20. The annular band 30 may comprise an elastomeric shear layer, a first membrane having reinforced layers adhered to the radially innermost extent of the elastomeric shear layer, and a second membrane having reinforced layers adhered to the radially outermost extent of the elastomeric shear layer. The tread portion 20 may have no grooves or may have a plurality of longitudinally oriented tread grooves forming essentially longitudinal tread ribs therebetween. Ribs may be further divided transversely or longitudinally to form a tread pattern adapted to the usage requirements of the particular vehicle application. Tread grooves may have any depth consistent with the intended use of the tire.

The second membrane may be offset radially inward from the bottom of the tread groove a sufficient distance to protect the structure of the second membrane from cuts and small penetrations of the tread portion 20. The offset distance may be increased or decreased depending on the intended use of the tire 10. For example, a heavy truck tire may use an offset distance of about 5 mm to 7 mm.

Each of the layers of the first and second membranes may comprise essentially inextensible reinforcing cords embedded in an elastomeric coating. For a tire constructed of elastomeric materials, membranes may be adhered to the shear layer by the vulcanization of the elastomeric materials. The membranes may be adhered to the shear layer by any other suitable method of chemical or adhesive bonding or mechanical fixation.

The reinforcing cords of the first and second membranes may be suitable tire belt reinforcements, such as monofilaments or cords of steel, aramid, and/or other high modulus textiles. For example, the reinforcing cords may be steel cords of four wires of 0.28 mm diameter (4×0.28). Although the reinforcing cords may vary for each of the membranes, any suitable material may be employed for the membranes which meets the requirements for the tensile stiffness, bending stiffness, and compressive buckling resistance required by the annular band. Further, the membrane structures may be a homogeneous material, a fiber reinforced matrix, or a layer having discrete reinforcing elements (e.g., short fibers, nanotubes, etc.).

In the first membrane, the layers may have essentially parallel cords oriented at an angle relative to the tire equatorial plane and the cords of the respective adjacent layers may have an opposite orientation. Similarly, for the second membrane, the layers may have essentially parallel cords oriented at opposite angles to the equatorial plane. These angles may be in the range of about −5° to about +5°. Alternatively, the cords of adjacent layers in a membrane may not be oriented at equal and opposite angles. For example, it may be desirable for the cords of adjacent layers to be asymmetric relative to the tire equatorial plane. The cords of each of the layers may be embedded in an elastomeric coating layer having a shear modulus of about 20 MPa. The shear modulus of the coating layers may be greater than the shear modulus of the shear layer so that the deformation of the annular band is primarily by shear deformation within shear layer.

As the vertical deflection of the tire increases, the contact length, or footprint, may increase such that the compressive stress in the second membrane exceeds its critical buckling stress and a longitudinal buckling of the second membrane may occur. This buckling phenomenon may cause a longitudinally extending section of the footprint region to have reduced contact pressure. A more uniform ground contact pressure throughout the length of the footprint may be obtained when buckling of the membrane is mitigated and/or avoided.

The hoop structure 30 may be similar to the annular band described above, an annular, homogenous hoop of metal, polymer, rubber, reinforced rubber, or fabric, and/or a multiple layer structure of alternating steel cord plies or filament plies and rubber shear layers as long as the hoop structure can support the appropriate load by its compressive hoop strength. Once the tire 10 is fully constructed, the hoop structure 30 may be secured to the radially inner surface 64 of the ply structure 60 by the overall structure of the tire (e.g., friction, mechanical constraint, etc.) or by an adhesive. This is a departure from conventional pneumatic and non-pneumatic tires, where a hoop structure is exclusively connected to the radially outer surface of the connecting structure, be it plies, a combination of pressurized air and plies, spokes, or other web geometries. A tire 10 in accordance with the present invention may result in the interface between the hoop structure 30 and the ply structure 60 being in compression 180 degrees from the footprint (e.g., top of the tire), where the tensile ply loads are the highest.

The material of the shear band 30 may have a shear modulus in the range of 15 MPa to 80 MPa, or 40 MPa to 60 MPa. The shear modulus is defined using a pure shear deformation test, recording the stress and strain, and determining the slope of the resulting stress-strain curve. It may be desirable to maximize EI and minimize GA. An acceptable ratio of GA/EI for a conventional tire may be between 0.01 and 20.0. However, acceptable ratios of GA/EI for a shear band 30 be 0.02 to 100.0, or between 21.0 and 100.0, or between 1.0 and 50.0.

The tread portion 20 may be secured to the radially outer surface 62 of the ply structure 60 by an adhesive. The hoop structure 30 may have a concave, or toroidal, shape producing a curved tread portion 20 as is desirable. The hoop structure 30 and ply structure 60 may thereby define a cavity 68 that may or may not be open to the atmosphere and/or unpressurized. When the tread portion 20 has been suitably worn down from use, the entire vehicle rim/tire assembly 10 may remain assembled while the remains of the tread portion are ground down and replaced by a new tread portion, similar to a conventional retreading process.

Advantageously, the above-described shear band 30 may be replaced by a shear band 130 in accordance with the present invention. As shown in FIG. 1, the shear band 130 may include a first double layer of steel cords 131 and a second double layer of steels cords 132 sandwiching a first layer of jumbo cords 141, a second layer of jumbo cords 142, and a single layer of steel cords 151. The steel cords 131, 132, 151 may include cord constructions similar to those used in conventional overlay packages for pneumatic tires, as described above. The jumbo cords 141, 142 may include twisted organic fibers, such as nylon cords. The steel cords 131, 132, 151 and jumbo cords 141, 142 may run at angles in the range of about −5° to about +5°.

Such a construction of the shear band 130 may mitigate cut propagation, have higher elongation at break, have higher impact resistance, have better fatigue properties, have higher bending resistance, have less moisture sensitivity, produce lower rolling resistance, and generate less heat than monofilament designs.

Figure 2:
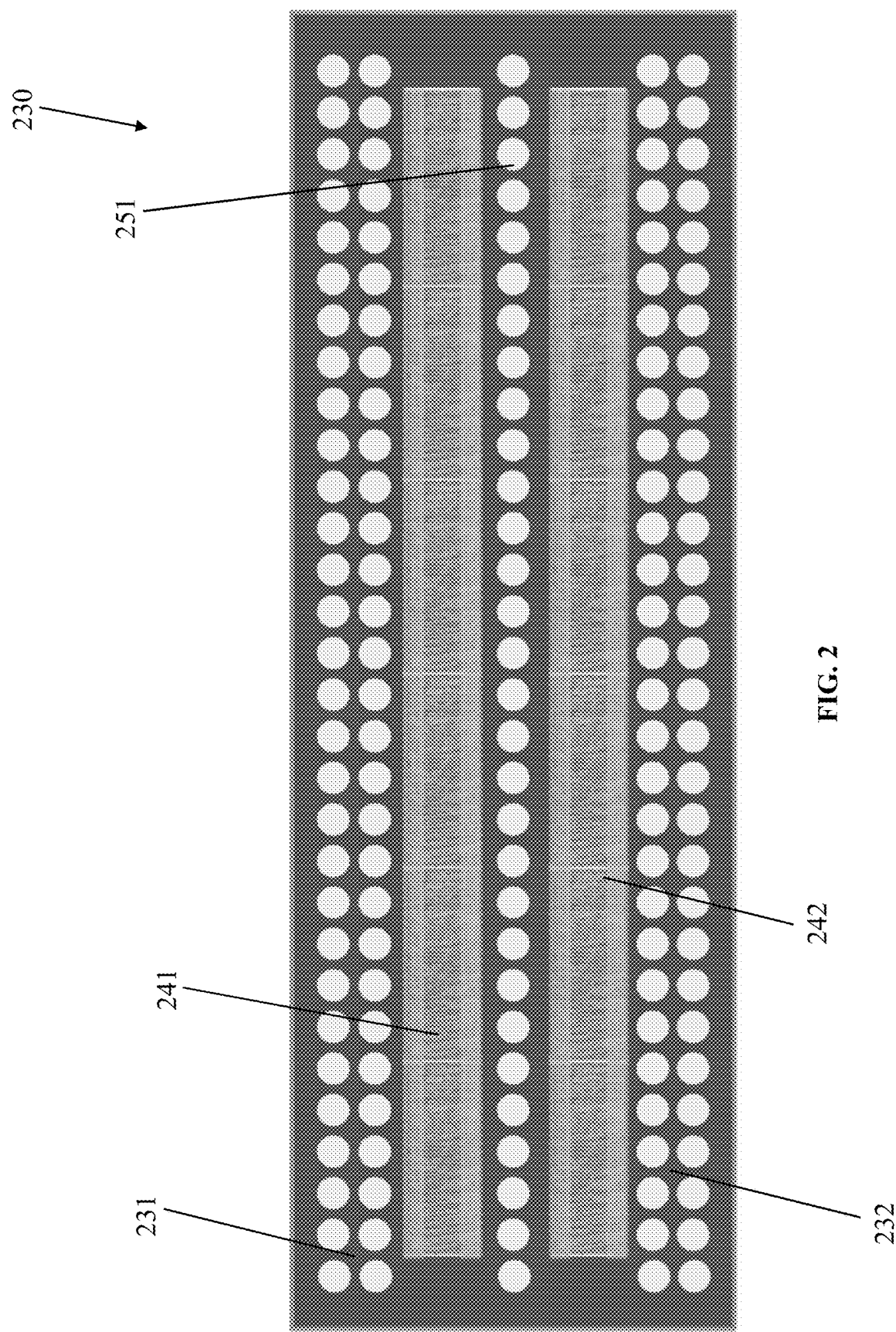
FIG. 2 is a schematic cross section view of part of another tire/wheel assembly in accordance with the present invention.

Again advantageously, the above-described shear band 30 may be replaced by another shear band 230 in accordance with the present invention. As shown in FIG. 2, the shear band 230 may include a first double layer of steel cords 231 and a second double layer of steels cords 232 sandwiching a first layer of non-woven reinforcement 241, a second layer of non-woven reinforcement 242, and a single layer of steel cords 251. The steel cords 231, 232, 251 may include cord constructions similar to those used in conventional overlay packages for pneumatic tires, as described above. The steel cords 231, 232, 251 may run at angles in the range of about −5° to about +5°.

The non-woven reinforcement 241, 242 may include vertically, or radially, lapped non-woven individual polyester filaments bonded to a rubber matrix of the shear band 230. Such a construction of the shear band 230 may mitigate cut propagation, have higher elongation at break, have higher impact resistance, have better fatigue properties, have higher bending resistance, have less moisture sensitivity, produce lower rolling resistance, and generate less heat than monofilament designs.

Applicants understand that many other variations are apparent to one of ordinary skill in the art from a reading of the above specification. These variations and other variations are within the spirit and scope of the present invention as defined by the following appended claims.

What is claimed:

1. A structurally supported tire comprising
a ground contacting annular tread portion;
    an annular hoop structure for supporting a load on the tire, the hoop structure including a first double layer of steel cords and a second double layer of steels cords sandwiching a first layer of non-woven reinforcement, a second layer of non-woven reinforcement, and a single layer of steel cords; and
a ply structure secured to a vehicle rim and the tread portion, the hoop structure being secured to a radially inner surface of the ply structure.

2. The structurally supported tire as set forth in claim 1 wherein inner radii of the ply structure are attached to the vehicle rim through two mechanical clamps each capturing a part of the ply structure.

3. The structurally supported tire as set forth in claim 1 wherein the first double layer of steel cords extend at an angle of between −5° to +5° relative to the circumferential direction of the tire.

4. A structurally supported tire and rim assembly comprising
a ground contacting annular tread portion;
    an annular hoop structure for supporting a load on a tire, the hoop structure including a first double layer of steel cords and a second double layer of steels cords sandwiching a first layer of non-woven reinforcement, a second layer of non-woven reinforcement, and a single layer of steel cords; and
a ply structure secured to a vehicle rim.

5. The assembly as set forth in claim 4 wherein the ply structure includes a plurality of strips of material extending between the vehicle rim and adjacent the hoop structure.

6. The assembly as set forth in claim 4 wherein the ply structure consists of one single strip of material extending repeatedly between the vehicle rim and adjacent the hoop structure.

7. The assembly as set forth in claim 4 wherein the single layer of steel cords absorbs shear strain between the first double layer and the second double layer.

* * * * *